United States Patent
Ringström et al.

(10) Patent No.: US 8,441,938 B2
(45) Date of Patent: May 14, 2013

(54) METHODS AND ARRANGEMENTS IN A WIRELESS COMMUNICATIONS SYSTEM

(75) Inventors: Markus Ringström, Stockholm (SE); Dirk Gerstenberger, Stockholm (SE); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 261 days.

(21) Appl. No.: 12/933,594

(22) PCT Filed: Dec. 10, 2008

(86) PCT No.: PCT/SE2008/051434
§ 371 (c)(1),
(2), (4) Date: Sep. 20, 2010

(87) PCT Pub. No.: WO2009/116916
PCT Pub. Date: Sep. 24, 2009

(65) Prior Publication Data
US 2011/0014907 A1     Jan. 20, 2011

Related U.S. Application Data

(60) Provisional application No. 61/037,432, filed on Mar. 18, 2008.

(51) Int. Cl.
*H04L 12/00* (2006.01)
*H04J 9/00* (2006.01)

(52) U.S. Cl.
USPC ........... 370/238; 370/276; 370/320; 370/335; 370/342; 370/441; 370/473; 370/252; 370/389; 370/392; 375/225; 375/345; 455/522

(58) Field of Classification Search ............ 370/278, 370/276, 275, 297, 389, 401, 310.1, 310.2, 370/312, 441, 473; 455/522, 442; 375/225, 375/345
See application file for complete search history.

(56) References Cited

U.S. PATENT DOCUMENTS

| | | | | |
|---|---|---|---|---|
| 6,594,501 B2 * | 7/2003 | Black et al. | ................... | 455/522 |
| 7,206,332 B2 * | 4/2007 | Kwan et al. | ................... | 375/140 |
| 7,447,516 B2 * | 11/2008 | Heo et al. | ...................... | 455/522 |
| 7,817,597 B2 * | 10/2010 | Usuda et al. | .................. | 370/329 |
| 7,948,958 B2 * | 5/2011 | Vimpari et al. | ............... | 370/342 |

(Continued)

FOREIGN PATENT DOCUMENTS
WO    WO 2006/031177 A    3/2006

*Primary Examiner* — Dang Ton
*Assistant Examiner* — Sai Aung (57) ABSTRACT

The present invention relates to methods and arrangements for uplink retransmissions from a user equipment to a radio base station in a UTRAN with enhanced uplink. The UE transmits a subframe comprising physical control channel(s) and physical data channel(s) in an initial transmission. According to the present invention, one or more of the physical control channels are transmitted with a lower transmission power level in all or some of the retransmitted subframes in the uplink. This results in reduced control overhead (a smaller part of the transmission power resource is used for control signaling) and thus reduced interference from the overhead. At the same time, the transmission power resource no longer used for the physical control channel information, can be used to increase the transmission power level of the physical data channel information in these retransmitted subframes, which improves the uplink coverage.

24 Claims, 4 Drawing Sheets

U.S. PATENT DOCUMENTS

| | | | |
|---|---|---|---|
| 8,160,049 B2 * | 4/2012 | Chandra et al. | 370/349 |
| 2003/0108013 A1 * | 6/2003 | Hwang et al. | 370/335 |
| 2004/0219920 A1 * | 11/2004 | Love et al. | 455/442 |
| 2005/0013263 A1 * | 1/2005 | Kim et al. | 370/320 |
| 2005/0117559 A1 * | 6/2005 | Malladi et al. | 370/342 |
| 2006/0067279 A1 | 3/2006 | Kim et al. | |

* cited by examiner

METHODS AND ARRANGEMENTS IN A WIRELESS COMMUNICATIONS SYSTEM

PRIORITY CLAIM

This application claims the benefit of U.S. Provisional Application No. 61/037,432, filed Mar. 18, 2008, the disclosure of which is fully incorporated herein by reference.

TECHNICAL FIELD

The present invention relates to the area of wireless communications and especially to improvements of uplink coverage in a Universal mobile telecommunications system Terrestrial Radio Access Network (UTRAN) with enhanced uplink.

BACKGROUND

Figure 1:
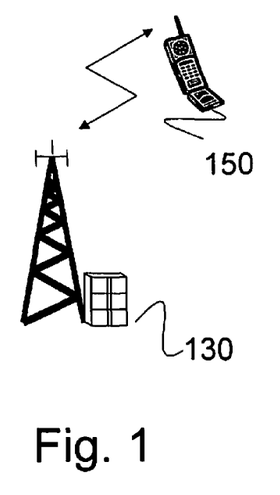
FIG. 1 illustrates schematically a part of a UTRAN with enhanced uplink wherein the present invention may be implemented.

The Universal Mobile Telecommunication System (UMTS), also referred to as the third generation (3G) system or the wideband code division multiplexing access (WCDMA) system, is designed to succeed GSM. UMTS Terrestrial Radio Access Network (UTRAN) is the radio access network of a UMTS system. In the UTRAN architecture, user equipment (UE) 150 is wirelessly connected to a NodeB 130, as illustrated in FIG. 1.

High-Speed Downlink Packet Access (HSPDA) is an evolution of UTRAN bringing further enhancements to the provisioning of packet-data services both in terms of system and end-user performance. The downlink packet-data enhancements of HSDPA are complemented with Enhanced Uplink (EUL), also known as High-Speed Uplink Packet Access (HSUPA). EUL provides improvements in the uplink capabilities and performance in terms of higher data rates, reduced latency, and improved system capacity, and is therefore a natural complement to HSDPA. HSDPA and EUL are often jointly referred to as High-Speed Packet Access (HSPA). The evolution of UTRAN has been strongly focused on increased data rates and reduced Round Trip Times (RTT), to support the use of delay sensitive packet-data services. RTT is defined as the time it takes for a packet to get to a remote place and back again. In order to allow for reduced RTT and increased data rates, the Transmission Time Interval (TTI) is shortened. TTI is defined as the duration of data transmission where coding and interleaving is performed.

In a UTRAN, the dedicated transport channel is called Dedicate Channel (DCH). The DCH carries all the information to/from a specific UE from/to higher layers including the data for the actual service and higher layer control information. The DCH is mapped onto two physical channels: The Dedicated Physical Data Channel (DPDCH) carrying higher layer information (which includes the user data), and the Dedicated Physical Control Channel (DPCCH) carrying the physical layer control information.

Figure 2:
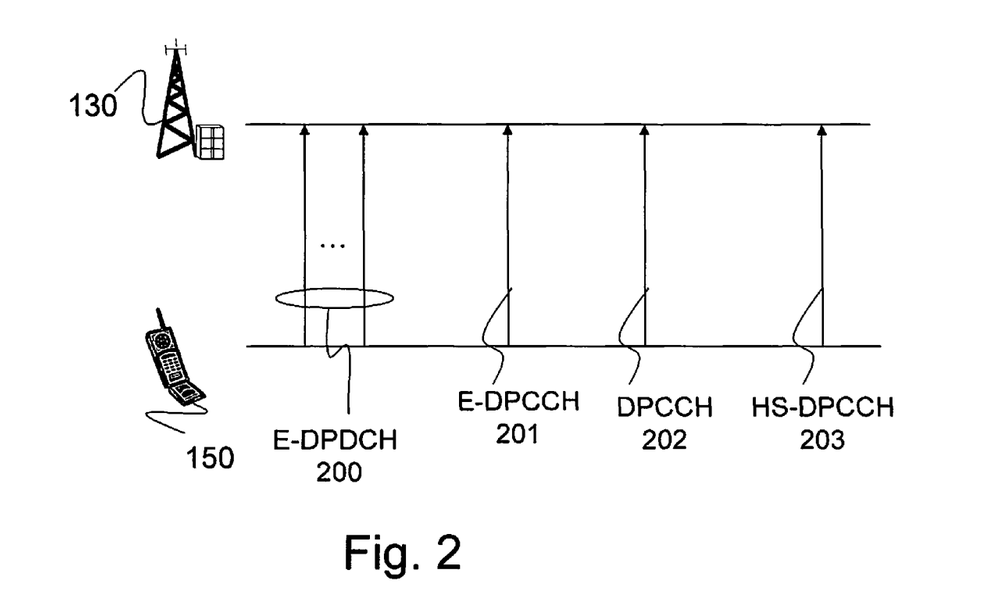
FIG. 2 illustrates schematically the uplink physical data channels and physical control channels available in a UTRAN with HSPA (HSDPA and EUL).

In a UTRAN with HSPA, the EUL enhancements are implemented through a new dedicated transport channel: the Enhanced Dedicated Channel (E-DCH). A short TTI of 2 ms is supported by the E-DCH to allow for reduced RTT (as discussed above). An alternative TTI length of 10 ms is also supported, and the network can configure the appropriate TTI value. Simultaneous transmission of E-DCH and DCH is possible. The uplink data and control channels used for E-DCH support are illustrated in FIG. 2. The E-DCH is mapped to a set of uplink channelization codes known as E-DCH Dedicated Physical Data Channels (E-DPDCH) 200. In order for the NodeB to demodulate and decode the data transmission on the E-DPDCH 200, control signaling is needed on the uplink, and the E-DCH Dedicated Physical Control Channel (E-DPCCH) 201 is used for this purpose. The DPCCH 202 carries the pilot signal and transmission power control commands. There is also an uplink channel for the HSDPA related control signaling, called HSDPA Dedicated Physical Control Channel (HS-DPCCH) 203.

Although a short TTI is generally beneficial for upper layer protocols and applications, there is a downside as well: The reliability of the transmitted data (and thus the coverage) decreases with a shortened TTI, as a shortened TTI means reduced energy per information bit. One solution to this problem is to increase the transmission power and thus increase the energy per information bit. This might be possible on the downlink, but in the uplink and especially in the case of a coverage limited scenario, the UE is in general already transmitting close to its maximum transmission power.

Another solution to the problem is to reduce the number of information bits and thus to get more energy per information bit. Though reducing the number of data channel information bits (within a TTI or subframe) may increase the coverage, this approach has the disadvantage of increased control overhead, i.e. an unbalanced relation between the control channel information and the data channel information.

Yet another solution to the problem of decreased reliability or coverage is to rely on retransmissions on lower layers, typically Hybrid Automatic Repeat Request HARQ retransmissions. This solution is used in UTRAN HSPA systems.

HARQ is a combination of forward error-correcting (FEC) coding and Automatic Repeat Request (ARQ). In FEC coding, redundancy is introduced in the transmitted signal. Parity bits are added to the information bits prior to the transmission, and the parity bits are computed from the information bits using a method given by the coding structure used. In an ARQ scheme, the receiver uses an error-detecting code to detect when the received packet is in error and a retransmission is requested in that case. If no error is detected, a positive acknowledgement (ACK) is sent to the transmitter, and if an error is detected, a negative acknowledgement (NAK) is sent. HARQ thus uses FEC codes to correct a subset of all errors and relies on error detection with retransmission for handling the rest of the errors.

Taking the example of HARQ retransmissions in uplink in a UTRAN with HSPA, the NodeB receives a subframe, comprising both the physical control channels (e.g. DPCCH, HS-DPCCH and E-DPCCH) and the physical data channels (E-DPDCH), in an initial transmission from the UE. Based on the E-DPCCH, the NodeB will try to demodulate and decode the E-DPDCH. If there are non correctable errors in the physical data channel information, the information cannot be decoded and the NodeB will ask for a retransmission of the subframe by sending a NAK to the UE. The entire subframe is then retransmitted by the UE.

One disadvantage of the retransmission solution is that the physical control channel information is retransmitted together with the physical data channel information in every retransmission, although the control channel information has already been received in the initial retransmission. A part of the scarce uplink transmission power resource is thus used for redundant control data.

SUMMARY

The object of the present invention is to provide methods and arrangements that obviate some of the above disadvantages, and that improves the uplink coverage in a UTRAN with enhanced uplink, by reducing the control overhead in uplink retransmissions.

This is achieved by transmitting redundant physical control channel information with a transmission power level that is lower than in the initial transmission, in all or some of the retransmissions, thus saving enhanced uplink transmission power resources. This also gives the possibility to increase the transmission power of the physical data channel information in these same retransmissions, which affects the enhanced uplink coverage positively.

Thus in accordance with a first aspect of the present invention, a method of uplink retransmissions in a user equipment of a UTRAN with enhanced uplink is provided. The method comprises the step of transmitting a subframe comprising a first number of physical control channel(s) and a second number of physical data channel(s) in an initial transmission. It further comprises the step of retransmitting the subframe in a third number N of a total number M of retransmissions, where N is smaller than M. It also comprises a step of retransmitting the subframe in the remaining M-N retransmissions, where at least one of the first number of physical control channel(s) has a lower transmission power level than the corresponding physical control channel(s) in the initial transmission, and at least one of the second number of physical data channel(s) has a higher transmission power level than the corresponding physical data channel(s) in the initial transmission.

In accordance with a second aspect of the present invention, a method of uplink retransmissions in a NodeB of a UTRAN with enhanced uplink is provided. The method comprises the step of receiving a subframe comprising a first number of physical control channel(s) and a second number of physical data channel(s) in an initial transmission received from a user equipment. It further comprises the step of receiving the subframe in a third number N of a total number M of retransmissions received from the user equipment, where N is smaller than M. It also comprises the step of receiving the subframe in the remaining M-N retransmissions received from the user equipment, where at least one of the first number of physical control channel(s) has a lower transmission power level than the corresponding physical control channel(s) in the initial transmission, and at least one of the second number of physical data channel(s) has a higher transmission power level than the corresponding physical data channel(s) in the initial transmission.

In accordance with a third aspect of the present invention, a UE of a Universal Mobile Telecommunications System Terrestrial Radio Access Network, UTRAN, with enhanced uplink is provided. The UE comprises means for transmitting a subframe comprising a first number of physical control channel(s) and a second number of physical data channel(s) in an initial transmission. It also comprises means for retransmitting the subframe in a third number N of a total number M of retransmissions, where N is smaller than M. It further comprises means for retransmitting the subframe in the remaining M-N retransmissions, where at least one of the first number of physical control channel(s) has a lower transmission power level than the corresponding physical control channel(s) in the initial transmission, and at least one of the second number of physical data channel(s) has a higher transmission power level than the corresponding physical data channel(s) in the initial transmission.

In accordance with a fourth aspect of the present invention, a NodeB is provided. The NodeB comprises means for receiving a subframe comprising a first number of physical control channel(s) and a second number of physical data channel(s) in an initial transmission received from a user equipment. It also comprises means for receiving the subframe in a third number N of a total number M of retransmissions received from said user equipment, where N is smaller than M. The NodeB further comprises means for receiving the subframe in the remaining M-N retransmissions received from the user equipment, where at least one of the first number of physical control channel(s) has a lower transmission power level than the corresponding physical control channel(s) in the initial transmission, and at least one of the second number of physical data channel(s) has a higher transmission power level than the corresponding physical data channel(s) in the initial transmission.

An advantage of embodiments of the present invention is that a smaller part of the total uplink transmission power resource is used for physical control channels, and a larger part is used for physical data channels, which improves the uplink coverage. The overhead reduction also results in an increased capacity in the own cell as well as in neighboring cells as less interference is transmitted in terms of control overhead.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention relates to methods and arrangements for uplink retransmissions from a user equipment to a radio base station in a UTRAN with enhanced uplink. The UE transmits a subframe comprising physical control channel(s) and physical data channel(s) in an initial transmission. According to the present invention, one or more of the physical control channels are transmitted with a lower transmission power level in all or some of the retransmitted subframes in the uplink. This results in reduced control overhead (a smaller part of the transmission power resource is used for control signaling) and thus reduced interference from the overhead. At the same time, the transmission power resource no longer used for the physical control channel information, can be used to increase the transmission power level of the physical data channel information in these retransmitted subframes, which improves the uplink coverage.

Thus, according to a first embodiment, a subframe comprising physical control channels and physical data channels is transmitted in an initial transmission. This initial transmission will be followed by a number of retransmissions, e.g. autonomous retransmissions. In all or in a subset of these retransmissions, the transmission power level of at least one of the physical control channels will be decreased in relation to the initial transmission, while the transmission power level of at least one of the physical data channels will be increased. This is possible since the physical control channel information is redundant, as it has already been decoded once by the NodeB in the initial transmission.

One special case of this first embodiment is when the transmission power level of at least one of the physical control channels is zero, which means that this physical control channel is completely excluded from that retransmission.

The benefit of the first embodiment is that the control overhead is reduced which results in decreased interference. Another benefit is that a larger part of the transmission power resource is used for the physical data channels, thus increasing the uplink coverage as there is more energy per physical data channel information bit.

In order to increase the probability of a successful reception of the physical control channel information in the initial transmission and since the information might not be repeated in all subsequent retransmissions, the physical control channel transmission power may be increased in the initial transmission in relation to the physical data channel transmission.

To keep track of the Retransmission Sequence Number (RSN, which is zero for the initial transmission and incremented by one for each subsequent retransmission) the NodeB will assume that the UE takes the proper action suggested by the ACK/NAK transmitted by the NodeB. This may for example be combined with blind detection of the physical control channel to enhance the performance in case of a misunderstanding in the signaling.

Figure 3A:
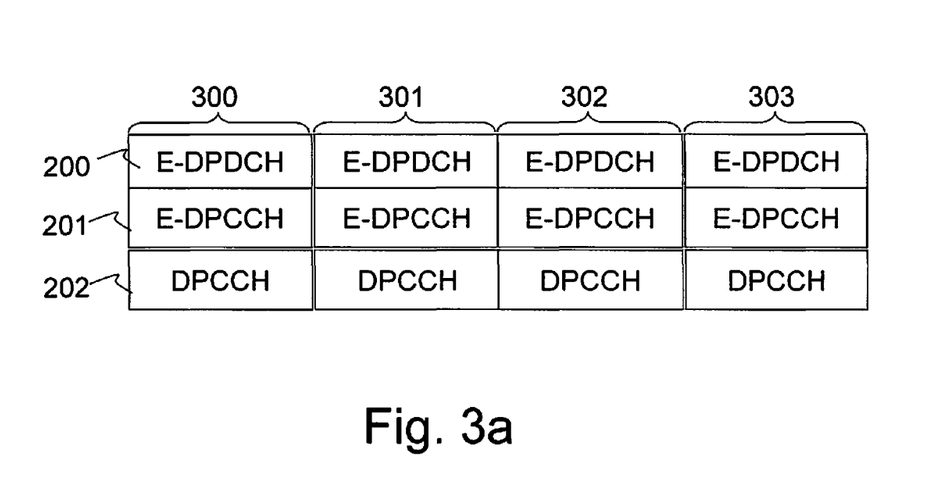
FIG. 3a illustrates schematically an uplink initial transmission and three retransmissions of a subframe comprising DPCCH, E-DPCCH and E-DPDCH, according to prior art.
Figure 3B:
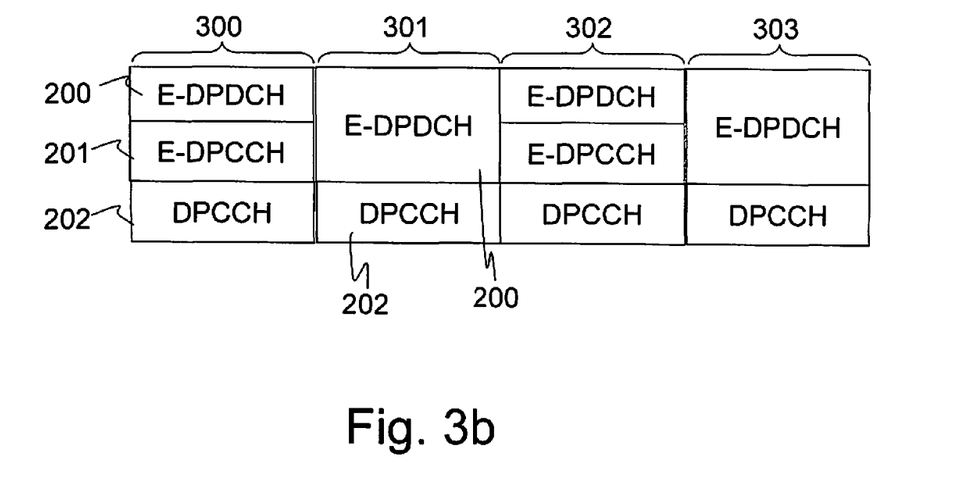
FIG. 3b illustrates schematically an uplink initial transmission and three retransmissions of a subframe comprising DPCCH, E-DPCCH and E-DPDCH in the initial transmission, according to embodiments of the present invention.

According to a second embodiment of the present invention, the physical control channel that is excluded from (i.e. the transmission power level is zero) or retransmitted with lower transmission power in some or all of the retransmissions is the E-DPCCH. E-DPCCH carries control information needed for the NodeB to demodulate and decode the E-DPDCH. A comparison between FIGS. 3a and 3b, illustrates the difference between prior art and the present invention. In FIG. 3a (prior art), the physical control channels (E-DPCCH 201 and DPCCH 202) are transmitted together with the physical data channel (E-DPDCH) 200 in all transmissions, including the initial transmission 300 and consecutive retransmissions 301, 302, 303. In FIG. 3b, illustrating a non-limiting example of an initial uplink transmission 300 and the retransmissions 301, 302, 303 according to the second embodiment of the present invention, the E-DPCCH 201 is excluded from some of the retransmissions. The E-DPCCH 201 is sent in the initial transmission 300 and in the second retransmission 302, but not in the first 301 and third 303 retransmission. This leaves more transmission power for the E-DPDCH 200 in the first 301 and the third 303 retransmission, which will thus increase the uplink coverage.

According to a third embodiment of the present invention, the physical control channel that is excluded from or retransmitted with lower transmission power in some or all of the retransmissions is the DPCCH. This embodiment may impact for example the downlink power control and can be used when trading in optimized downlink power control for uplink coverage.

According to a fourth embodiment the physical control channel that is excluded from or retransmitted with lower transmission power in some or all of the retransmissions is both the E-DPCCH and the DPCCH. This is thus a combination of the two previous embodiments. Other physical control channels and combinations may also be considered.

To reduce the delay introduced by the HARQ retransmissions, one solution is to allow a pre-defined number of consecutive retransmissions without awaiting the ACK or NAK between them. This kind of consecutive retransmissions are hereinafter referred to as autonomous retransmissions. According to a fifth embodiment of the present invention, autonomous retransmissions are used, and as the number of retransmissions is pre-defined (configured by the UE or the network), the NodeB is aware of the required number of retransmissions without any signaling. There is thus no need to keep track of the RSN or to use blind detection of the physical control channel in order to get a good performance. Thus, this results in that this embodiment is less sensitive to signaling errors.

As described above, the physical control channel transmission power may be increased in the initial transmission in relation to the physical data channel transmission, in order to increase the probability of a successful reception of the physical control channel information in the initial transmission. In the case of autonomous retransmissions, it is possible to exclude the physical data channels completely in the initial transmission, thus leaving all available transmission power resources to the physical control channels.

Some of the retransmissions on the uplink may be self-decodable, while others are not. The information in a self-decodable retransmission can be decoded based on the information in that retransmission only. In a non self-decodable retransmission, at least one of the previous retransmissions is needed in order to decode the information. According to a sixth embodiment, it is always a self-decodable retransmission that is chosen for retransmitting the physical control channel and the physical data channel with the same relation between the transmission power levels as in the initial transmission. The retransmissions where the transmission power level of at least one of the physical control channels is lowered or set to zero are the non self-decodable ones. The reasoning behind this is that these retransmissions anyhow always need an earlier retransmission with physical control channel information to be decoded. In this embodiment, unnecessary retransmissions of physical control channel information are thus avoided, which again allows for an optimal use of the transmission power.

Figure 4A:
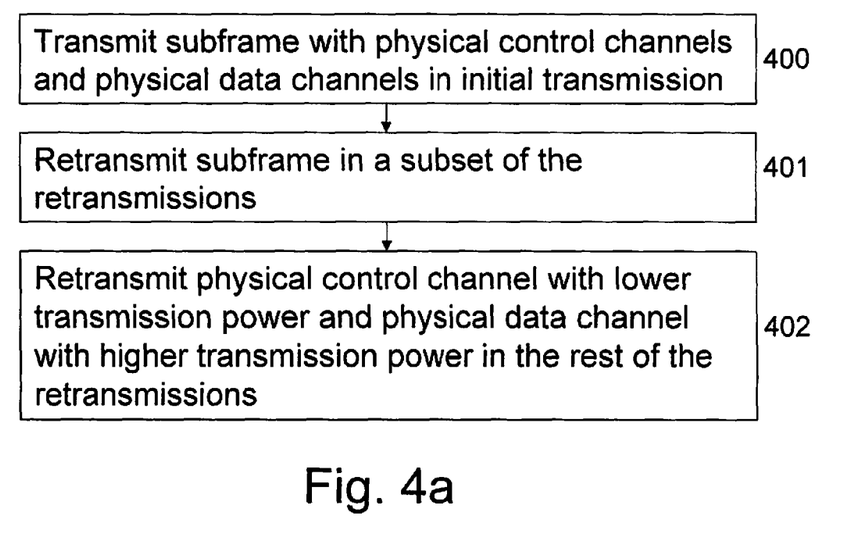
FIGS. 4a and 4b are flowcharts of the methods of the UE and NodeB respectively according to embodiments of the present invention.

FIG. 4a is a flowchart of the method for the UE, according to the first embodiment of the present invention described above. In step 400, a subframe comprising physical control channel information and physical data channel information is transmitted on the uplink, in an initial transmission. In step

401, the UE will—in a subset of the retransmissions following the initial transmission—retransmit the subframe with the same relation between transmission power levels of the control channels and the data channels as in the initial transmission. This step 401 could thus be performed in every second retransmission or in even fewer retransmissions or in no retransmissions at all. In step 402, the UE will—in the rest of the retransmissions—retransmit one or more of the physical control channels with a lower transmission power level than in the initial transmission, and will use the freed transmission power resource to retransmit one or more of the physical data channels with a higher transmission power level than in the initial transmission. This will thus enable increased uplink coverage, as a larger portion of the transmission power is used for physical data channels.

Figure 4B:
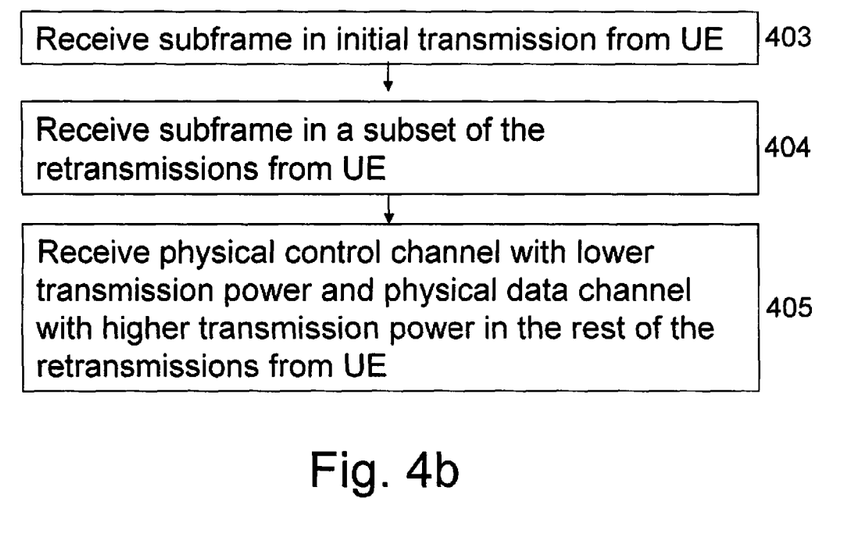

Furthermore, FIG. 4b is a flowchart of the method for the NodeB, according to the first embodiment of the present invention described above. In step 403, the NodeB receives a subframe comprising both physical control channel information and physical data channel information in an initial uplink transmission from the UE. The NodeB will then, in step 404 and 405, receive a total number of retransmissions that follow the initial transmission. In step 404, the NodeB receives the subframe in a subset of the retransmissions from the UE with the same relation between the different control and data channels transmission power levels as in the initial transmission. In step 405, the NodeB will, in the rest of the retransmissions from the UE, receive the physical control channel with lower transmission power level than in the initial transmission and will receive the physical data channel with a higher transmission power level than in the initial transmission.

Figure 5:
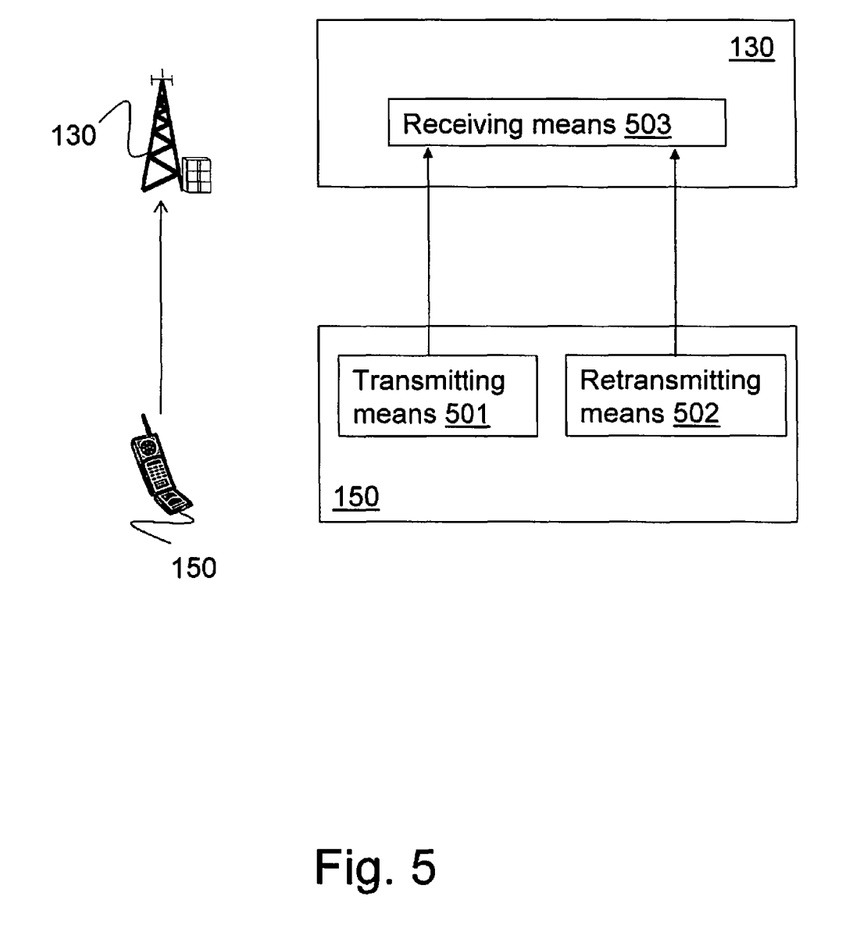
FIG. 5 illustrates schematically the NodeB and UE according to embodiments of the present invention.

Schematically illustrated in FIG. 5 and according to the first embodiment described above, the UE 150 comprises transmitting means 501 for transmitting a subframe comprising physical control channels and physical data channels. It also comprises retransmitting means 502 for retransmitting the subframe with the physical data channel information in a subset of the retransmissions, and for retransmitting the subframe with decreased transmission power of the physical control channel and increased transmission power of the physical data channel in the rest of the retransmissions.

Also illustrated in FIG. 5 is the NodeB 130. It comprises receiving means 503, for receiving a subframe with both physical control channel and physical data channel information in an initial transmission. The receiving means 503 are also used for receiving the subframe with the physical data channel information in a subset of the retransmissions from the UE, and for receiving the subframe with decreased transmission power of the physical control channel and increased transmission power of the physical data channel in the rest of the retransmissions from the UE.

It should be noted that the means illustrated in FIG. 5 may be implemented by physical or logical entities using software functioning in conjunction with a programmed microprocessor or general purpose computer, and/or using an application specific integrated circuit (ASIC).

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method of uplink retransmissions in a user equipment of a Universal Mobile Telecommunications System Terrestrial Radio Access Network (UTRAN) with enhanced uplink, comprising the steps of:

transmitting in an initial uplink transmission, a subframe comprising a first number of physical control channels and a second number of physical data channels at initial power settings for the physical control channels and the physical data channels;

retransmitting the subframe at the initial power settings in a number N of a total number M of retransmissions, where N is smaller than M; and retransmitting the subframe in the remaining M-N retransmissions in a manner to reduce control overhead, wherein at least one of the first number of physical control channels has a lower transmission power level than the corresponding physical control channels in the initial transmission, and at least one of the second number of physical data channels has a higher transmission power level than the corresponding physical data channels in the initial transmission.

2. The method according to claim 1, wherein said lower transmission power level is zero.

3. The method according to claim 1, wherein one of said physical control channels with lower transmission power level is the dedicated physical control channel for the enhanced dedicated channel.

4. The method according to claim 1 wherein one of said physical control channels with lower transmission power level is the dedicated physical control channel.

5. The method according to claim 1, wherein said M retransmissions are transmitted without awaiting an acknowledgement or non-acknowledgment.

6. The method according to claim 1, wherein said N retransmissions are self-decodable retransmissions.

7. A method of uplink retransmissions in a NodeB of a Universal Mobile Telecommunications System Terrestrial Radio Access Network (UTRAN) with enhanced uplink, said method comprising the steps of:

receiving in an initial uplink transmission from a user equipment, a subframe comprising a first number of physical control channels and a second number of physical data channels at initial power settings for the physical control channels and the physical data channels;

receiving the subframe at the initial power settings in a number N of a total number M of retransmissions received from said user equipment, where N is smaller than M; and receiving the subframe in the remaining M-N retransmissions received from said user equipment in a manner to reduce control overhead, wherein at least one of the first number of physical control channels has a lower transmission power level than the corresponding physical control channels in the initial transmission, and at least one of the second number of physical data channels has a higher transmission power level than the corresponding physical data channels in the initial transmission.

8. The method according to claim 7, wherein said lower transmission power level is zero.

9. The method according to claim 7, wherein one of said physical control channels with lower transmission power level is the dedicated physical control channel for the enhanced dedicated channel.

10. The method according to claim 7, wherein one of said physical control channels with lower transmission power level is the dedicated physical control channel.

11. The method according to claim 7 wherein said M retransmissions are transmitted without awaiting an acknowledgement or non-acknowledgment.

12. The method according to claim 7, wherein said N retransmissions are self-decodable retransmissions.

13. A user equipment for use in a Universal Mobile Telecommunications System Terrestrial Radio Access Network (UTRAN) with enhanced uplink, comprising:
- means for transmitting in an initial uplink transmission, a subframe comprising a first number of physical control channels and a second number of physical data channels at initial power settings for the physical control channels and the physical data channels;
- means for retransmitting the subframe at the initial power settings in a number N of a total number M of retransmissions, where N is smaller than M; and
- means for retransmitting the subframe in the remaining M-N retransmissions in a manner to reduce control overhead, wherein at least one of the first number of physical control channels has a lower transmission power level than the corresponding physical control channels in the initial transmission, and at least one of the second number of physical data channels has a higher transmission power level than the corresponding physical data channels in the initial transmission.

14. The user equipment according to claim 13, wherein said lower transmission power level is zero.

15. The user equipment according to claim 13, wherein one of said physical control channels with lower transmission power level is the dedicated physical control channel for the enhanced dedicated channel.

16. The user equipment according to claim 13, wherein one of said physical control channels with lower transmission power level is the dedicated physical control channel.

17. The user equipment according to claim 13, wherein said M retransmissions are transmitted without awaiting an acknowledgement or non-acknowledgment.

18. The user equipment according to claim 13, wherein said N retransmissions are self-decodable retransmissions.

19. A NodeB of a Universal Mobile Telecommunications System Terrestrial Radio Access Network (UTRAN) with enhanced uplink, comprising:
- means for receiving in an initial uplink transmission from a user equipment, a subframe comprising a first number of physical control channels and a second number of physical data channels at initial power settings for the physical control channels and the physical data channels;
- means for receiving the subframe at the initial power settings in a number N of a total number M of retransmissions received from said user equipment, where N is smaller than M; and
- means for receiving the subframe in the remaining M-N retransmissions received from said user equipment in a manner to reduce control overhead, wherein at least one of the first number of physical control channels has a lower transmission power level than the corresponding physical control channels in the initial transmission, and at least one of the second number of physical data channels has a higher transmission power level than the corresponding physical data channels in the initial transmission.

20. The NodeB according to claim 19, wherein said lower transmission power level is zero.

21. The NodeB according to claim 19, wherein one of said physical control channels with lower transmission power level is the dedicated physical control channel for the enhanced dedicated channel.

22. The NodeB according to claim 19, wherein one of said physical control channels with lower transmission power level is the dedicated physical control channel.

23. The NodeB according to claim 19, wherein said M retransmissions are transmitted without awaiting an acknowledgement or non-acknowledgment.

24. The NodeB according to claim 19, wherein said N retransmissions are self-decodable retransmissions.

* * * * *